July 13, 1954 J. M. NICHOLS 2,683,391
STEREOSCOPIC BOOK DEVICE
Filed Jan. 17, 1951 3 Sheets-Sheet 1
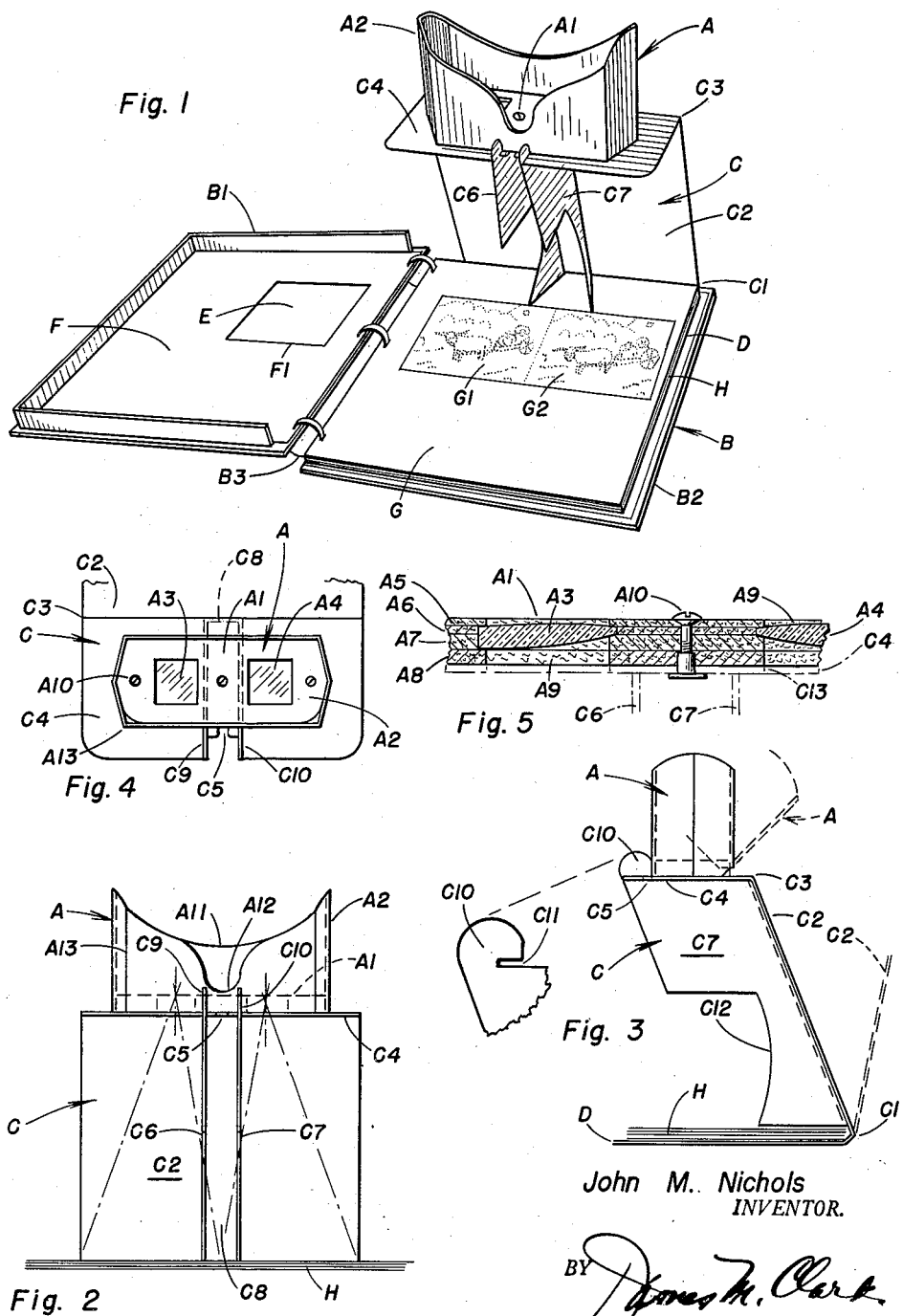
John M. Nichols
INVENTOR.

July 13, 1954     J. M. NICHOLS     2,683,391
STEREOSCOPIC BOOK DEVICE

Filed Jan. 17, 1951     3 Sheets-Sheet 2

John M. Nichols
INVENTOR.

BY
HIS PATENT ATTORNEY.

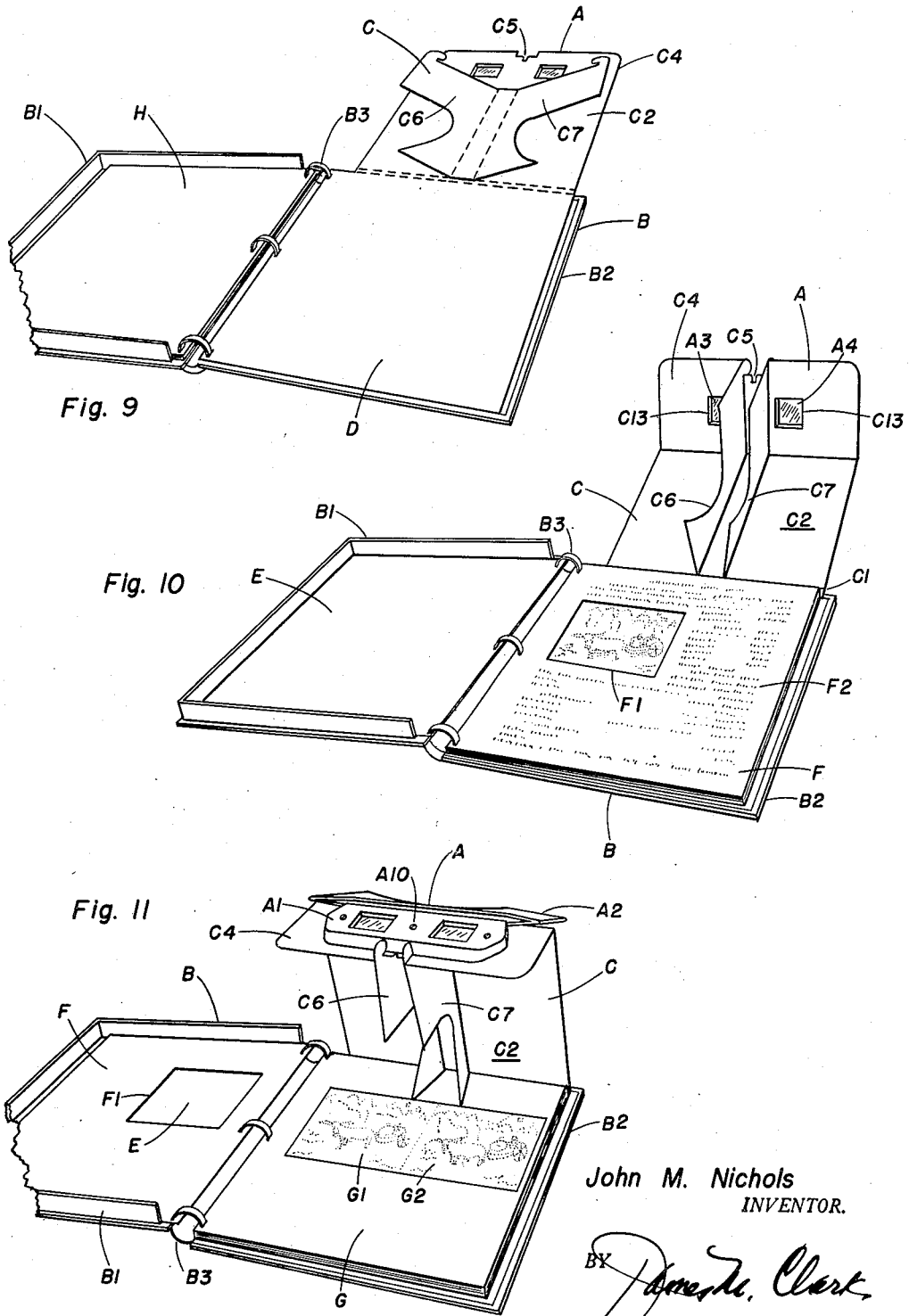

Patented July 13, 1954

2,683,391

UNITED STATES PATENT OFFICE 2,683,391

STEREOSCOPIC BOOK DEVICE

John M. Nichols, Hempstead, N. Y.

Application January 17, 1951, Serial No. 206,352

8 Claims. (Cl. 88—30)

The present invention relates generally to stereoscopes and books, and more particularly to an improved folding stereoscope forming an integral portion of an album, book, or like device.

It is an object of the present invention to provide an improved stereoscopic book which is simple, inexpensive to manufacture, and easy to operate. It is a further object to provide an improved stereoscopic book which is particularly adapted for amusement, educational, and instructional, purposes. It is a still further object of the present invention to provide a folding stereoscopic device which is self-adjusting and self-positioning for accurately focusing and viewing stereoscopic pictures within an album, book or similar device. A further object resides in the provision of a folding stereoscope which forms an integral portion of a book or album to which it is hingedly mounted for resting upon the pages of the book and is readily adapted for swinging aside as the pages may be turned. It is a still further object to provide such a stereoscope which may be used in the normal reading position, namely, normal or vertical to the leaves or pages of the book as they rest against either cover upon a horizontal or inclined supporting surface. It is a further object to provide such a stereo book which is adapted for use as a story book, or text book, in which both printed text and stereoscopic pictures are provided on these pages. Additional objects include the retractability of the folding stereoscope to a compact folded position within the outline of the book, the provision of an enclosing dust-tight box cover for the leaves of the book and the stereo device, as well as an improved arrangement of the respective parts.

Other objects and advantages of the present invention will occur to those skilled in the art after reading the following description, taken in conjunction with the accompanying drawings, forming a part hereof, in which:

Figure 1 is a perspective view of the improved folding stereoscope and book in an operative viewing position;

Figure 2 is a front elevational view of the folding stereoscope in the viewing position of Fig. 1;

Figure 3 is a side elevational view;

Figure 4 is a fragmentary plan view of the same;

Figure 5 is an enlarged cross-sectional view of a portion of the lens carrying assembly;

Figure 9 is a similar view with the stereoscope and supporting leaf turned over;

Figure 10 is a similar view with the supporting brackets engaging the lens carrying assembly; and Figure 11 is a similar view of the stereoscope folded forwardly and upwardly into a viewing position showing the shield still in its folded position.

Referring now to Figs. 1 to 5, inclusive, A designates the folding stereoscope viewer and B represents the album or book of which it forms an integral part. The folding stereoscope A comprises essentially a lens carrying or supporting assembly A1, a hood or eye shield A2 and the foldable support assembly C. The book B includes a front cover and enclosing box B1, a back cover B2 and a binder B3, preferably of the comb or spiral type to permit the pages to lie flat. The latter is hinged to and forms an integral assembly with the bottom or back supporting sheet D, which may be the same size as the other sheets of the book, which preferably also includes a title page E, a first apertured page F, a stereoscopic picture page G, and a plurality of further pages H. In the form of the device disclosed herein for explanatory purposes the folding stereoscope and the book are manufactured essentially (with the exception of the lenses A3 and A4, the binder element B3, and the fastening screws or staples A10) from paper, cardboard or paperboard stock of proper size and weight, although it will be understood that other suitable materials may be utilized for such purposes.

Figure 8:
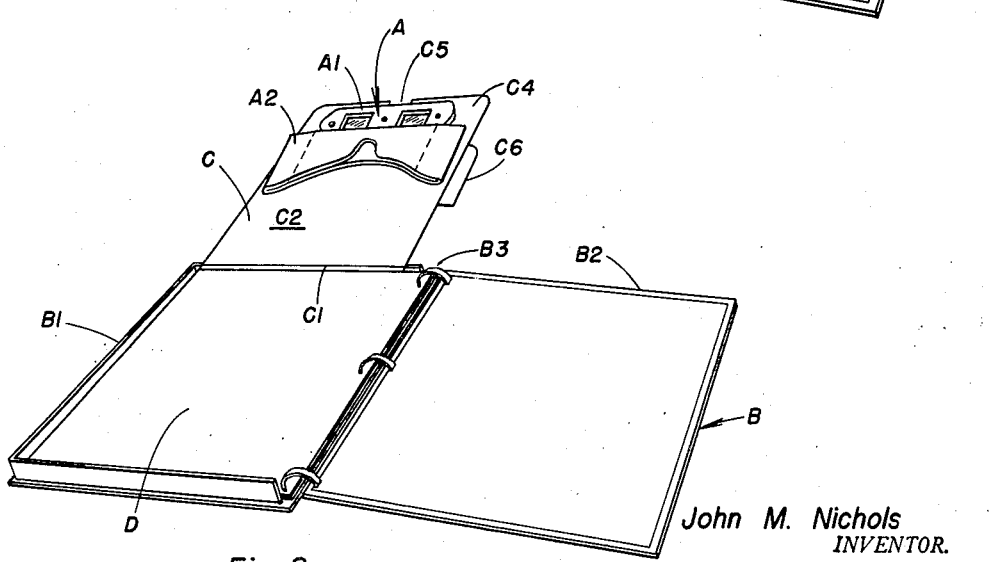
Figure 8 is a similar view with the stereoscope folded outwardly and rearwardly.

As indicated above, the viewing portion A of the folding stereoscope comprises a lens carrier assembly A1 and the folding eye shield or hood A2. The lens carrier assembly A1 may preferably be formed from a plurality of thicknesses, to the back of one of which the eye shield A2 is preferably hingedly attached. As indicated in Fig. 5, the lenses A3 and A4, which may either be formed from glass or transparent plastic material, are suitably clamped between the apertured sheets A5, A6, A7 and A8. The openings within these sheets are such that they are readily assembled about the lenses A3 and A4, positioning and securing the same therebetween, and providing the viewing openings A9, with the entire assembly clamped together by means of the threaded fasteners A10, which also embrace the top shelf or platen portion C4 of the supporting assembly C. The eye shield A2 is preferably a six-sided foldable element having a back portion cut curvedly as at A11 to fit against the forehead of the viewer, and having its front portion curvedly recessed as at A12 to accommodate the viewer's cheeks and nose. The eye shield A2 is preferably provided with a plurality of folding corners A13 such that it is hinged to fold downwardly into its operative position with its lower portion engaging the six-sided outline of the lens supporting assembly A1 and held thereby in its unfolded or open operative position. As shown in Fig. 3, the eye shield may be folded rearwardly in which it is disengaged from the lens support A1 as shown in the dotted lines in this figure and when so disengaged may be flattened out such that the rear and front portions A11 and A12 become contiguous and the eye shield lies in a relatively flat position for storage within the book as more particularly indicated in Fig. 8.

The stereo supporting assembly C comprises essentially a hinge C1 by means of which it is hingedly attached to the back support sheet D, a main back sheet or portion C2 to which the lens supporting shelf or platen C4 is hingedly connected by the fold C3. The front of the platen C4 is provided with a notch C5 which is engageable by the supporting bracket assembly comprising the brackets C6 and C7 having a common integral portion C8, suitably adhered, or otherwise fastened, to the main back sheet C2. The upper forward portions of the brackets C6 and C7 are formed into rounded notched finger gripping tabs C9 and C10, notched as at C11 in Fig. 3, in such manner that the tabs C9 and C10 may be pressed together and the platen C4 folded downwardly.

As the tab portions C9 and C10 of the brackets C6 and C7 are released and spring outwardly, the notches C11 engage the tongue portions of the platen C4 on either side of the notch C5 therein, and the tabs C9 and C10 bear against the sides of the notch C5. This limits the outward springing movement of the brackets C6 and C7 for rigidly maintaining the same in their parallel operative positions in which they support the platen C4 and the attached lens supporting assembly A1 in a position parallel to the back sheet D and the remaining pages H of the book or album at the predetermined distance above the top page at which the stereoscopic pictures, such as G1 and G2, may be positioned in focus for proper viewing. The upper portions of the brackets C6 and C7 serve also as baffle or partitioning means to provide for proper stereoscopic viewing of the pictures and to prevent or block the viewing of more than the single desired pictures by each eye of the viewer. The lower portions of the brackets C6 and C7 may preferably be cut-away as at C12 in order that the viewing of the desired picture is not obstructed. The lower terminals of the cutout portions C12 are preferably disposed such that the bearing portions at the lower edges of the brackets C6 and C7 terminate in the region of or just short of the upper margins of the stereoscopic pictures G1 and G2, and the lower portions of the brackets may be suitably flared outwardly as indicated in Fig. 1 to provide increased lateral stability and greater rigidity to the folding stereoscope A and the supporting structure C.

Figure 6:
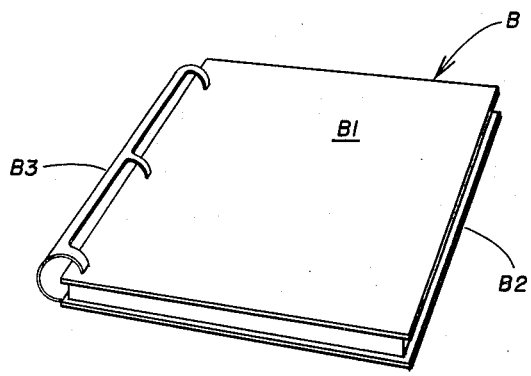
Figure 6 is a perspective view of the stereoscopic book in its closed position.
Figure 7:
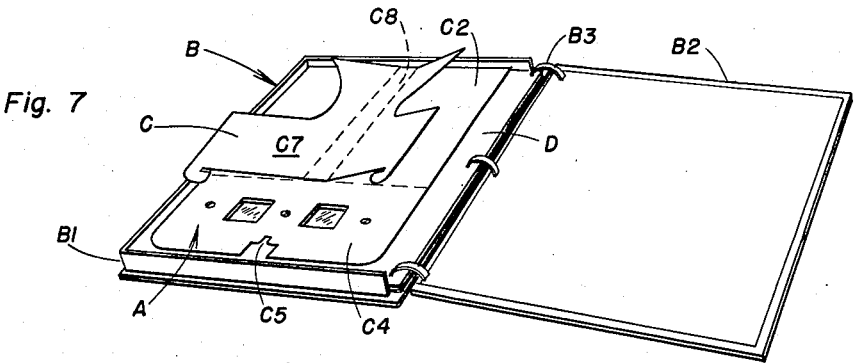
Figure 7 is a similar view of the same in an initially opened position.

A preferred method of utilizing the improved stereoscopic book is as follows: From the closed position of the book as shown in Fig. 6, in which B1 represents the top or front cover having a three sided box enclosure secured thereto, B2 represents the back or bottom cover, and the binding indicated at B3, the book is turned over such that it lies on its front cover B1 and the back cover B2 opened out such that the folding stereoscope is exposed as shown in Fig. 7. In this position the folding stereoscope and supporting assemblies A and C are shown in their flattened retracted position in which they are relatively compact and require a small portion of the thickness of the book or album. In its retracted position, the back C2 of the supporting structure and the front end C4 are unfolded and lie in the same horizontal plane, and the brackets C6 and C7 extend oppositely and outwardly in a flattened relationship. The folded assembly may then be grasped, and keeping the same in its folded or flattened relationship, it is then moved rearwardly about the hinge C1 such that it assumes the position shown in Fig. 8, with the folded stereoscope lying in the same substantially horizontal plane as the back supporting sheet D.

The entire folding stereoscope together with the back sheet D may then be turned over to rest upon the back cover B2 of the book B such that it assumes the position shown in Fig. 9, in which the brackets C6 and C7 of the supporting assembly are disposed on the top of the back C2. The brackets C6 and C7 may then be pinched together such that their ear or tab portions C9 and C10 touch each other and the platen C4 folded upwardly and forwardly about the hinge C3 such that the tabs extend into the notch C5. When released the notches C11 in the tabs engage the projecting tongue of the flattened portion C4, thereby forming a rigid assembly of the back C2, the platen C4, and the brackets C6 and C7, as shown in Fig. 10. The pages of the book may then be turned over toward the right to rest upon the back of the book B2 and the back sheet D, and the text F2 which may be a description, a story or other printed matter then read in conjunction with the single picture which appears through the apertures or cutout in the first page F of the book. The text F2 may preferably include at the bottom of the page F a notation to the effect that the sheet F may be turned over and the stereoscope viewer moved into its operative position, as shown in Fig. 11, for the stereoscopic viewing of the illustrations or pictures G1 and G2 which appear on the succeeding page G. This is accomplished by folding or moving the stereoscope upwardly and forwardly about the hinge C1 into the operative position shown in Fig. 11, and by folding the eye shield portion A2 forwardly into frictional engagement with the ends of the lens supporting assembly A2. The stereoscope is now completely unfolded into its operative position as shown in Fig. 1, in which the illustrations G1 and G2 are in registry for the proper viewing of these illustrations with the desired stereoscopic or third dimensional effect. For continued reading and viewing through the remaining pages H of the book, it is merely necessary to move the entire stereoscope backward sufficiently to a retracted position, to permit lifting and turning of each page, and to move the stereoscope forward again into its operative position for the viewing of the desired illustrations. To restore the book again to its closed condition it is merely necessary to reverse each of the above desired steps.

It will be understood that the preferred form of the device has been shown and described merely by way of illustration and other forms and modifications of the device which may occur to those skilled in the art upon reading the foregoing description are intended to come within the scope and spirit of this invention as more particularly set forth in the appended claims.

I claim:

1. The combination with a book having a stereoscopic picture on one of its pages and a stereoscope attached to the book, of mounting means for supporting the stereoscope in operative position above said page for vertical viewing of said picture including a back sheet hingedly attached adjacent the top edge of said book, a bracket element hingedly attached to said back sheet and having base portions arranged to bear upon said page for the support of said stereoscope and a folding eye shield operatively hinged to said stereoscope, the said hinged attachments of said back sheet and said bracket element and the folding of said eye shield permitting complete retraction and storage of said mounting means and said stereoscope within said book without separation and loss of adjustment between each of said elements and said book.

2. The combination with a book having stereoscopic pictures on its pages and a stereoscope foldably attached to a supporting page of the book, of folding means for supporting the stereoscope in an operative position above said pages for vertical viewing of said pictures while horizontally disposed including a back sheet hingedly attached to the top edge of said supporting page, a bracket element foldably attached to said back sheet, said bracket element having base portions arranged to bear upon said pages for the support of said stereoscope in said operative position and a folding eye shield operatively hinged to said stereoscope.

3. In a stereoscopic device, a book having a stereoscopic picture on one of its pages said book having a further page having a cut-out portion adapted to expose a portion only of said stereoscopic picture, a stereoscope, a supporting sheet in said book, a folding supporting assembly attached to the top edge of said supporting sheet and to said stereoscope arranged for movement from a retracted position within the outline of said book to an extended operative position for the support of said stereoscope upon either of said pages, said stereoscope arranged to be folded backwardly away from the viewer to permit turning of said pages and normal viewing of said cutout page without using said stereoscope.

4. In a stereoscopic device, a book having stereoscopic pictures on its pages, a folding stereoscope, a supporting sheet forming a page of said book, a back sheet hingedly attached to said stereoscope and to said supporting sheet, bracket means foldably attached to said back sheet, said stereoscope having a notched portion, said bracket means having an upwardly extending tongue selectively engageable with said notched portion of said stereoscope for retaining and supporting the same in a substantially horizontal position parallel to the pages of said book for stereoscopic viewing in a direction normal thereto, and folding eye shield means carried by said stereoscope, the said hinged attachments of said back sheet and said bracket element and the folding of said eye shield means permitting complete retraction and storage of said mounting means and said stereoscope within said book without separation and loss of adjustment between each of said elements and said book.

5. In a stereoscopic device, a book having stereoscopic pictures on its pages, a stereoscope, a supporting sheet in said book, a back sheet attached to said stereoscope and to said supporting sheet, bracket means attached to said back sheet for cooperating therewith in the support of said stereoscope in an operative position above said pages, said stereoscope having a notched portion, tongue means carried by said bracket means for engagement with said notched portion for retaining said stereoscope, said bracket means, and said back sheet in a rigid relationship for the support of said stereoscope in its operative position above said pages, and folding eye shield means carried by said stereoscope, the said hinged attachments of said back sheet and said bracket element and the folding of said eye shield means permitting complete retraction and storage of said mounting means and said stereoscope within said book without separation and loss of adjustment between each of said elements and said book.

6. In a stereoscopic device; a book having stereoscopic pictures on its pages, a folding stereoscope; a supporting sheet forming a page of said book; a back sheet hingedly attached to said stereoscope and to said supporting sheet; bracket means foldably attached to said back sheet for cooperating therewith in the support of said stereoscope in an operative horizontal position above said pages; said stereoscope having a notched lens-carrying portion; tongue means carried by said bracket means for engagement with said notched portion for retaining said stereoscope, said bracket means, and said back sheet in a rigid relationship for the support of said stereoscope in its operative position above said pages, said stereoscope, said back sheet and said bracket means being foldable to a relatively flat retracted position within the outline of said book; and a foldable eye shield hinged to said lens-carrying portion.

7. A stereoscopic device of the type described in claim 6 characterized by said folding eye shield arranged for folding to a relatively flat retracted position within the outline of said book.

8. A stereoscopic device of the type described in claim 6 characterized by said folding eye shield arranged for folding with said back sheet and said bracket means in such manner as to permit complete retraction and storage within said book without separation and loss of adjustment between each of said elements and said book.

References Cited in the file of this patent

UNITED STATES PATENTS

| Number | Name | Date |
| --- | --- | --- |
| Re. 3,291 | Mascher | Feb. 9, 1869 |
| 40,654 | Tresize | Nov. 17, 1863 |
| 962,643 | Knopping | June 28, 1910 |
| 1,012,144 | Murphy | Dec. 19, 1911 |
| 1,024,613 | Berger | Apr. 30, 1912 |
| 1,281,746 | Allen et al. | Oct. 15, 1918 |
| 2,145,423 | Long | Jan. 31, 1939 |